United States Patent [19]
Koskolos et al.

[11] 3,908,510
[45] Sept. 30, 1975

[54] ADJUSTABLE DEPTH ROUTER

[75] Inventors: Nick J. Koskolos, Affton; Ralph R. Lefarth, St. Louis, both of Mo.

[73] Assignee: Intertherm, Inc., St. Louis, Mo.

[22] Filed: July 1, 1974

[21] Appl. No.: 484,770

[52] U.S. Cl............ 90/12 D; 90/DIG. 3; 144/136 C; 408/56
[51] Int. Cl.²......................................... B23C 1/20
[58] Field of Search.......... 90/12 D, DIG. 8, DIG. 3; 144/69, 70, 71, 68, 73, 75, 79, 81, 83, 87, 144/133 R, 134 D, 136 R, 136 C; 408/112, 56

[56] References Cited
UNITED STATES PATENTS

| | | | |
|---|---|---|---|
| 2,780,966 | 2/1957 | Frost et al............................ | 90/12 D |
| 3,034,549 | 5/1962 | Quackenbush................. | 144/134 D |
| 3,106,133 | 10/1963 | Arpaio, Jr. et al.................. | 90/12 D |

FOREIGN PATENTS OR APPLICATIONS

| | | | |
|---|---|---|---|
| 659,024 | 10/1951 | United Kingdom.................. | 408/56 |

*Primary Examiner*—Harrison L. Hinson
*Assistant Examiner*—Z. R. Bilinsky

[57] ABSTRACT

An adjustable depth router is particularly suited for routing openings in ducts beneath register openings in a floor, without use of router bit extensions. A small diameter pneumatic motor, whose casing is mounted at the lower end of an elongated air supply casing of the same diameter, holds the router bit at its lower end; this assembly is vertically adjustable in a router frame. When routing through a floor opening, the base is rested on the floor, the cylindrical assembly projects through the floor opening so the router bit will operate at the desired depth therebeneath; and the bearing of the cylindrical assembly against the edge of its floor opening guides the router. An opening is thus routed parallel to the floor opening and spaced inwardly by the difference between the radius of the casing and the radius of the router bit.

1 Claim, 4 Drawing Figures

ADJUSTABLE DEPTH ROUTER

BACKGROUND OF THE INVENTION

Conventional routers are adapted principally to cut an opening in a surface against which their slidable base assemblies may bear. Usually powered by electric motors, they sometimes include special provisions to blow air over the router bit. They have been used to cut openings at distances spacedly beneath the surface against which the routers may bear; one example is cutting openings in sub-floor ducts to connect duct registers. As disclosed in U.S. Pat. No. 3,606,404, when so used, conventional routers have been equipped with router bit extension shafts whose upper ends are chucked into the router. Extension shafts cannot run true, and routing with them is satisfactory only where the shaft length is limited. In handguided routers of the size conventionally used, this limit may be less than 5 inches; but even such length is undesirable for accurate work.

SUMMARY OF THE INVENTION

The objects of the present invention include elimination of use of extension shafts to hold router bits, so that the same router bit may be used both at a surface on which the router slides and substantially therebelow; making possible routing through a previously cut opening in the reference surface at a depth greater than has heretofore been found feasible, without objectionable deviation or vibration; and, when so routing, providing for accurate guiding along the edge of the cut opening.

Briefly summarizing, and without limiting the present invention, I equip a somewhat conventional slidable router frame assembly with an adjustable depth assembly, consisting principally of a small diameter motor and an extension casing. The lower end of the adjustable assembly is a preferably pneumatic motor whose elongated casing has a constant diameter; the hollow extension casing is of the same diameter and is secured rigidly to the upper end of the motor. The frame assembly has bores which define a vertical axis along which the adjustable assembly may be slid, to be clamped so as to make a routing cut at any desired depth.

When cutting below the floor level, through an opening previously cut, the cylindrical casing guides the router bit to cut along a line parallel to the edge of the opening and spacedly inward by the difference between the radius of the casing and the radius of the router bit. Using a pneumatic motor, the air supplied to the motor is discharged downwardly to blow chips from the vicinity of the router bit.

DESCRIPTION OF THE PREFERRED EMBODIMENT

The adjustable depth router of the embodiment illustrated consists of two principal assemblies: a slidable base assembly generally designated 10, and an elongated adjustable depth router assembly generally designated 11. The base assembly 10, being the more conventional of the two, will be first described.

Figure 1:
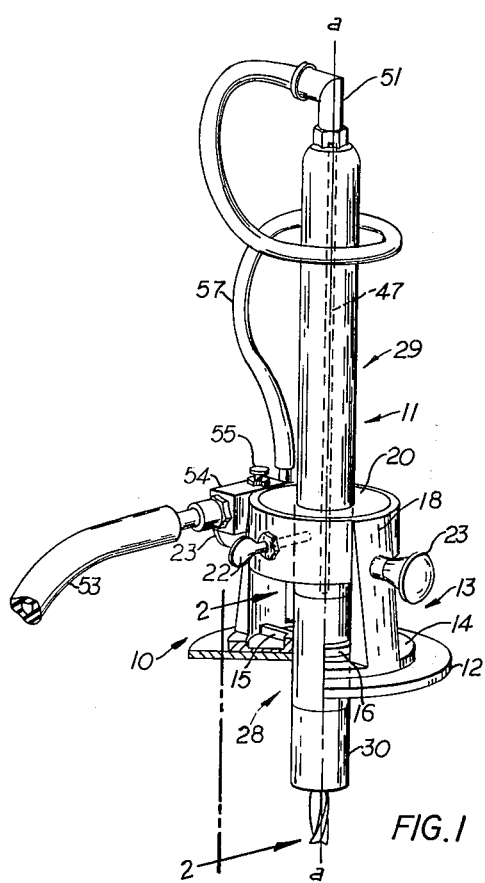
FIG. 1 is a perspective view of an adjustable depth router embodying the present invention, shown partly broken away.

On a planar base plate 12 which is preferably a circular disk made of material such as plastic which may have a smooth undersurface, a frame portion generally designated 13 is mounted. The frame portion 13, which may be formed as a casting, has a ring-like bottom portion 14 from which a plurality of ribs 15 extend inwardly to support a slide guide portion 16 formed concentric with a vertical axis $a-a$, as seen in FIG. 1. A pair of opposite strut portions 18 rise from the base 10 to an upper frame ring 19 which mounts an annular upper guide block 20 around the axis $a-a$. The openings in the annular guide block 20 and the slide guide portion 16 are of the same diameter, to permit slidable adjustment of the elongated router assembly 11; their vertical spacing from each other affords rigidity when the router is operated. In the upper frame ring 19, releasable clamping means are provided to secure the adjustable assembly 11 at a selected depth; in the preferred embodiment the clamping means are a simple thumb screw clamp 22. Projecting from both of the strut portions 18 are handles 23 which serve as conventional manual guidance means.

The elongated adjustable router assembly 11 has at least two, and preferably three, parts of equal diameter mounted contiguously and forming a continuing cylindrical assembly. These parts are: a pneumatic motor generally designated 28 having mounted onto its upper end a rigid elongated extension casing 29; and in the preferred embodiment shown, having a shield 30 projecting downwardly.

Figure 2:
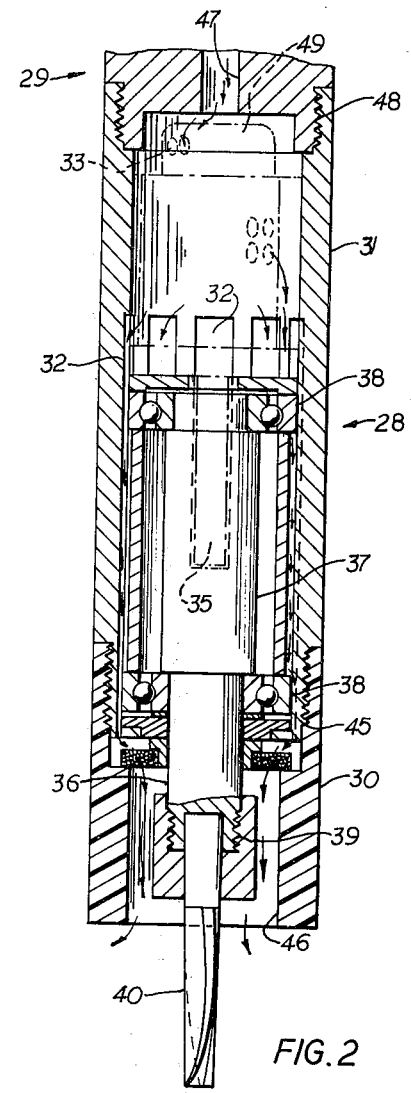
FIG. 2 is an enlarged fragmentary cross-sectional view taken along line 2—2 of FIG. 1.

The motor 28 of the preferred embodiment is a pneumatic motor, of a type conventionally available and shown partly schematically in the enlarged view of FIG. 2. It includes a hollow, constant-diameter outer cylindrical casing 31 whose lower inner bore may have distribution grooves 32 through which air is discharged. Entering through one or more upper air entrance ports 33 in an inner eccentric-type motor generally designated 34, air under pressure rotates its eccentric rotor having an output stub shaft 35 which drives a main output shaft 36, being inserted co-axially into the upper end of an aligned rotary assembly 37 including upper and lower ball bearing assemblies 38. The lower ball bearing assembly 38 is penetrated by openings to discharge air downwardly, radially outward of a simple chuck 39 mounted on the lower end of the output shaft 36. The chuck 39 holds a conventional router bit 40.

Below and closely adjacent to such air discharge provision is positioned an annular air filter 42, formed of metallic mesh or other conventional filter material. It is held in position by an inwardly presented annular shoulder 44 within the cylindrical shield 30. Above the shoulder 44, a screw threaded portion 45 engages threads at the lower end of the hollow cylindrical casing 31. Below the shoulder 44, the shield 30 has an inner cylindrical or tapering surface 46 which directs the discharged air over the router bit 40.

The principal function of the shield 30 is to provide a cylindrical portion of the same outer diameter as that of the motor casing 31, to project continuingly downward from it to provide for guiding contact where the router bit 40 is cutting at closely below a planar surface, as hereafter more fully described. Accordingly as seen in FIG. 2, the length of the shield 30 may advantageously project downward to about the level of the cutting flutes of the router bit 40.

The extension casing 29 is preferably a thick walled metal tube having a large central bore 47 and having lower end outwardly threaded as at 48 to engage complementary internal threads at the upper end of the motor casing 31. The bottom outlet 49 of the bore 47 is enlarged, as seen in FIG. 2, for distribution of air to the entrance ports 33 of the motor 28. At its upper end the extension casing 29 has a pressure-tight air inlet fitting 51.

Air under pressure is supplied from a source not shown through a flexible tube 53 to a pneumatic inlet valve 54 having a control button 55 mounted on the frame portion 13 of the base assembly 10, close to one of the handles 23. From the outlet side of the pneumatic valve 54, a pneumatic tubing conduit 57, which may be loosely coiled about the extension casing 29, carries the air to the air inlet fitting 51, for delivery through the bore 47 of the extension casing 29 to the motor 28, thence to be discharged downwardly through the motor lower end openings and filter 42. Air so discharged, being first confined inwardly of the inner shield surface 46, will be directed over the router bit 40, to blow away chips from the vicinity of cutting.

One of the unique advantages of the present router is that, without changing router bits 40 or utilizing any extension shaft within the chuck 39, a register opening may be first routed in a floor, and then a duct connector opening routed in a sub-floor duct. U.S. Pat. No. 3,606,404 shows a duct connector of the type referred to.

Sheet metal connector sections from floor registers to sub-floor ducts conventionally have an inward shoulder at their lower end, to rest on the marginal edge of the duct, aperture, with tabs foldable into the aperture and back upward. Using such a conventional connector section, the aperture to be cut in the upper wall of the duct $g$ has edges parallel to those of the floor openings and spacedly inward therefrom, when viewed from above. This presents the problem how to cut a duct opening offset inwardly of the edges of the floor aperture.

Figure 4:
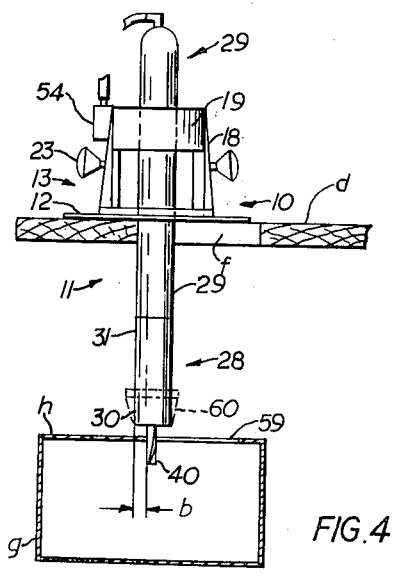
FIG. 4 is a view similar to FIG. 3 showing the router adjusted deeply downward, while routing an opening in the sub-floor duct and using the floor opening of FIG. 3 as a guide.

Using the present invention automatically provides a shoulder width $b$, shown in FIG. 4, equal to the difference between the radius of the adjustable assembly 11 and the radius of the router bit 40.

Figure 3:
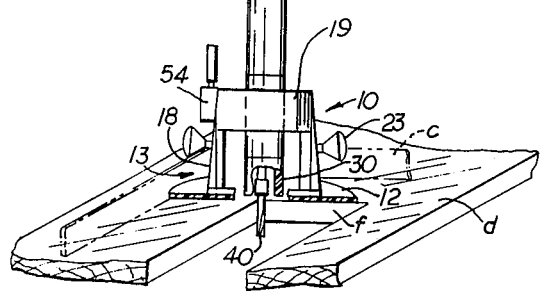
FIG. 3 is a schematic view of the adjustable depth router shown operating at maximum height, for routing an opening in a floor above a duct. A conventional routing guide is indicated in phantom lines.

To cut the floor opening $f$, as seen in FIG. 3, a generally rectangular router guide $c$, shown in phantom lines, may be preliminarily secured in position on the surface of a floor $d$. After a small preliminary cut, the present router tool is guided by contact with the edges of the base plate 12 against such guide $c$. For this operation, after loosening the thumb screw 22, the adjustable depth assembly 11 is slid upward to the position shown in FIG. 3, with the lower edge of the shield 30 clearing the surface of the floor $d$. In this position the present router operates like a conventional router whose motor is fixed in position within a frame above a base plate.

If a conventional router with the motor fixed in position was used to cut into a sub-floor duct, the router bit 40 would be removed from the chuck 39 and inserted in an extension shaft to be held in the chuck 39. Since extension shafts cannot run true, the limit to such sub-floor spacing might be four or five inches at most.

With the present routing tool, however, the adjustable assembly is repositioned by loosening the thumb screw clamp 22 and lowering the adjustable depth assembly 11 to the position shown in FIG. 4, where it is re-clamped. In this position the router bit 40 will be brought downwardly to the depth necessary for routing the opening 59 in the duct. It is to be noted that the outer surface of the extension casing 29 here serves as a guide to bear against the floor opening $f$; if the duct was positioned less deeply, this guiding function would be served by the motor casing 31 or shield 30. Guided against the edge surface $f$, the bit 40 will be positioned inwardly of the vertical surface $f$ by the amount $b$, as shown. Hence, when the cylindrical surface of either the extension casing 29, cylindrical motor casing 31 or shield 30 is brought to guide against the floor opening $f$, the routing cut will follow inwardly of the floor opening $f$ by the spacing $b$, equal to the difference in radii between that of the cylindrical members 28, 29 and 30 and the router bit 40. It is recognized that conventional router bits may be slightly tapered; therefore in this specification and the claims the router bit radius is to be taken as the approximate radius at the level at which it is cutting.

The use of the pneumatic motor 28 instead of an electrical motor has the following advantages: commercially available pneumatic motors have a length several times as great as the diameter of their casing, which is sufficiently small to serve to provide a desirable shoulder width $b$. The discharge of air downwardly out of the pneumatic motor blows away cuttings or chips without any added expense or mechanical complexity. Further, the structural requirements of the extension casing 29 — to be rigid and to be the same diameter as the casing 31 of the motor 28 and continuous therewith — readily adapt to conducting air under pressure to the pneumatic motor 28.

Various modifications will suggest themselves; for example a scale may be inscribed on the extension casing 29 readable against the upper guide block surface 20, to read the sub-floor depth of the router bit 40. If the extra rigidity afforded by the lower slide guide portion 16 is not required, this portion may be omitted, permitting use of a simple cap 60 (shown in phantom lines in FIG. 4) on the lower end of the motor 28 in place of the shield 30. If such a cap 60 were of larger diameter than the motor casing 31 this would cause difficulty only if the duct $g$ was spaced so closely below the floor $d$ as to interfere physically. Thus such modifications may involve a partial loss of the advantages of the construction shown herein. Nevertheless, the principles of this disclosure make possible routing over a great variation in depth, in which a motor, to which the router bit is chucked, may operate below, as well as above, the plane of the router base.

We claim:

1. A router adapted for subsurface cutting through a surface opening without use of an extension shaft, comprising A. a slidable base frame including a base plate having a planar lower face with a central opening therethrough, a frame portion arising therefrom and having an upper circular frame opening not larger than the central opening of the base plate, in axial registration therewith and at a fixed vertical spacing thereabove, whereby to define an axis for depth adjustment, and releasable means adjacent to said upper opening to clamp inwardly thereabout, in combination with B. an elongated router tool including
1. a lower cylindrical portion comprising a pneumatic motor having a cylindrical wall casing of such diameter as to be slidable within said upper frame opening and having at its lower end a chuck in which a router bit may be held centrally and an air outlet thereabout, and having inwardly of its wall an upper inlet for compressed air, and
2. an upper elongated tubular cylindrical extension casing whose outer surface is of the same diameter as that of the motor casing and secured to its upper end, whereby to form with it a constant diameter wall, the extension casing being of greater length than the motor casing and further being of greater length than the spacing from said base plate to said clamping means adjacent to the frame upper opening, said tubular casing having at its upper end a compressed air inlet and at its lower end means to deliver compressed air to the inlet of said motor, whereby for subsurface routing through an opening in a surface on which the base plate rests, the elongated router tool may be positioned adjustably downward so that the motor casing projects below the base plate, and may be clamped in position determined by the height of the extension casing remaining above said clamping means, the router in operation being guided along the edges of such surface opening by bearing against such edges of said constant diameter wall.

\* \* \* \* \*